(12) United States Patent
Bella et al.

(10) Patent No.: US 11,189,142 B2
(45) Date of Patent: Nov. 30, 2021

(54) THEFT-DETECTION ASSEMBLY AND SYSTEM FOR GOODS TRANSPORTATION AND STORAGE

(71) Applicant: TELECOM ITALIA S.p.A., Milan (IT)

(72) Inventors: Valter Bella, Turin (IT); Fabio Bellifemine; Laura Contin, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/622,705

(22) PCT Filed: Jun. 20, 2018

(86) PCT No.: PCT/EP2018/066365
§ 371 (c)(1),
(2) Date: Dec. 13, 2019

(87) PCT Pub. No.: WO2018/234358
PCT Pub. Date: Dec. 27, 2018

(65) Prior Publication Data
US 2020/0118407 A1   Apr. 16, 2020

(30) Foreign Application Priority Data
Jun. 23, 2017   (IT) .................. 102017000070280

(51) Int. Cl.
*G08B 13/24*  (2006.01)
*G08B 25/10*  (2006.01)
*H04B 5/00*  (2006.01)

(52) U.S. Cl.
CPC ..... *G08B 13/2417* (2013.01); *G08B 13/2462* (2013.01); *G08B 25/10* (2013.01); *H04B 5/0037* (2013.01)

(58) Field of Classification Search
None
See application file for complete search history.

(56) References Cited

U.S. PATENT DOCUMENTS 7,493,211 B2    2/2009  Breen
2007/0176771 A1*  8/2007  Doyle ................ G08B 13/1427
                                                340/539.13
(Continued)

FOREIGN PATENT DOCUMENTS

CN    202043195 U    11/2011
CN    106023497 A    10/2016

OTHER PUBLICATIONS

International Search Report dated Aug. 29, 2018 in PCT/EP2018/066365 filed Jun. 20, 2018.
(Continued)

*Primary Examiner* — Thomas S McCormack
(74) *Attorney, Agent, or Firm* — Oblon, McClelland, Maier & Neustadt, L.L.P.

(57) ABSTRACT

It is disclosed a theft-detection assembly for detecting the theft of an item, the theft-detection assembly comprising: a wireless power transmitter configured to broadcast electromagnetic waves within a given area; a locator device configured to be associated with the item and comprising a wireless power receiver configured to receive the electromagnetic waves. The locator device further comprises an actuating unit and an alarm unit, wherein: the actuating unit is connected to the wireless power receiver and is configured to, in the absence of the electromagnetic waves, actuate the alarm unit; and the alarm unit comprises a radio module configured to, upon actuation, transmit an alarm message over a wireless communication network.

17 Claims, 3 Drawing Sheets

(56) References Cited

U.S. PATENT DOCUMENTS

| | | | |
|---|---|---|---|
| 2008/0143516 A1* | 6/2008 | Mock | G08B 13/1427 |
| | | | 340/539.14 |
| 2012/0032803 A1 | 2/2012 | Copeland et al. | |
| 2014/0062668 A1 | 3/2014 | Gudan et al. | |
| 2014/0062671 A1 | 3/2014 | Gudan et al. | |
| 2014/0062672 A1 | 3/2014 | Gudan et al. | |
| 2014/0266698 A1* | 9/2014 | Hall | H04W 4/021 |
| | | | 340/539.13 |
| 2015/0065041 A1* | 3/2015 | Ahn | H02J 50/20 |
| | | | 455/41.1 |
| 2017/0201003 A1* | 7/2017 | Ackley | G06K 19/071 |

OTHER PUBLICATIONS

Office Action dated Feb. 24, 2021 in Chinese Patent Application No. 201880038165.4, with concise English translation.

* cited by examiner

THEFT-DETECTION ASSEMBLY AND SYSTEM FOR GOODS TRANSPORTATION AND STORAGE

TECHNICAL FIELD

The present invention relates to the field of goods transportation and storage. In particular, the present invention relates to a theft-detection assembly and system for the secure transportation and storage of goods (such as, for instance, electronic devices and pharmaceutical products).

BACKGROUND ART

Within the field of goods transportation, it is known to track the position of goods by providing them with devices including GPS transceivers, GSM transmitters/receivers and/or geo-fencing capabilities. Known systems provide for monitoring the position of the goods acquired from GPS satellites and/or the GSM communication network. If a geo-fence is used to delimit an authorized area (i.e. an area where goods are supposed to be securely located), an alarm may be triggered each time the GPS transceiver or the GSM receiver detects that the goods move across the geo-fence.

Moreover, it is known to employ geo-fencing techniques for tracking the position of goods on vehicles, by updating the geographic coordinates of the geo-fence while the vehicle is moving.

U.S. Pat. No. 7,493,211 B2 discloses a system and method of automatically replacing the geographic location of geo-fences stored in memory of a telematics system. The location of an asset is determined using an on-board telematics device with a location device. The location of the asset is compared with the location of predefined geo-fences stored in memory on the asset. When the asset is located within a geo-fence which triggers the replacement of geo-fences, the telematics system causes the asset to receive a new set of geo-fences, which replace the existing set of geo-fences in the telematics system memory. The operational cost of the system is reduced by minimizing communications charges when a reduced number of transmissions is needed to replace geo-fences stored in memory on the asset.

SUMMARY OF THE INVENTION

The Applicant has noticed that systems based on geo-fencing as cited above have some drawbacks.

Systems based on traditional geo-fencing methods might not be able to timely detect the theft of the transported goods. Indeed, typically, the authorized area that is bounded by geo-fences is wide enough to cover the entire path of the vehicle on which the goods are transported. If a theft event occurs far from the geo-fences of the authorized area, the alarm might be raised late or it might not be raised at all.

Moreover, the systems with geo-fencing capabilities, such as the system of U.S. Pat. No. 7,493,211 B2, include a power supply, such as a battery, to operate the system's components. In view of this, the inventors noticed that systems such as the one disclosed in U.S. Pat. No. 7,493,211 B2 are not suitable to be used for individually tracking the position of a package from a point of origin to its destination. Indeed, a package is often transported over a plurality of vehicles and stored in a number of warehouses. In such a case, in order to use geo-fencing, a battery should be associated with the package, and the operation of the system would be constrained by the battery life (i.e. by the battery charge duration). However, long-life batteries are costly.

In view of the above, the Applicant has tackled the problem of providing a theft-detection assembly and system for the transportation and storage of goods, which allow to overcome at least one of the drawbacks outlined above. In particular, the Applicant has tackled the problem of providing a theft-detection assembly and system for the transportation and storage of goods, which allow to timely generate an alarm in case a theft event is detected, without requiring costly batteries.

According to the invention, the problem above is solved by a theft-detection assembly and system which may be used for providing an anti-theft service to users wishing to secure transportation and storage of goods. The theft-detection assembly comprises a wireless power transmitter to be put in the area in which the goods are supposed to be securely located (for instance, inside the vehicle transporting the goods or inside the goods warehouse) for guaranteeing a radio coverage of the area, and one or more locator devices comprising respective wireless power receivers to be associated with any goods or package to be monitored. The wireless power receiver converts the electromagnetic field generated by the wireless power transmitter into the electricity used for supplying the other components of the locator device. Indeed, when the goods are moved away from the area that is covered by the wireless power transmitter, e.g. upon occurrence of a theft event, the locator device is operated in real time to raise an alarm and provide data including the date and time of the day of the theft event as well as information indicating the position of the locator device at the time of theft and afterwards. The data and information may be made available to the operators of a logistics service provider who may take consequent actions.

In the following description and in the claims, the expression "logistics service provider" will indicate a company or entity that manages the shipping of goods between points of origin to end-use destinations. It typically handles packaging, inventory, warehousing and shipping functions for the delivery of the goods. The operators of the logistics service provider are meant to be the persons in charge of the operations above. In the following description, the term "carrier" will indicate a company or entity, and any operator thereof, that transports the goods by air, land, or sea.

According to a first aspect, the present invention provides a system a theft-detection assembly for detecting the theft of an item, the theft-detection assembly comprising:
- a wireless power transmitter configured to broadcast electromagnetic waves within a given area;
- a locator device configured to be associated with the item and comprising a wireless power receiver configured to receive the electromagnetic waves, the locator device further comprising an actuating unit and an alarm unit, wherein:
  - the actuating unit is connected to the wireless power receiver and is configured to, in the absence of the electromagnetic waves, actuate the alarm unit; and
  - the alarm unit comprises a radio module configured to, upon actuation, transmit an alarm message over a wireless communication network.

Preferably, the locator device comprises a battery connected to the wireless power receiver and wherein the wireless power receiver is configured to, upon reception of the electromagnetic waves, generate an electric current and provide the electric current to the battery.

Preferably, the locator device comprises a barrier associated with the battery for inhibiting the electric current from flowing from the battery to the actuating unit when the assembly is not in operation.

According to another embodiment, the locator device comprises an enabler interposed between the battery and the actuating unit, the enabler being operatable to selectively inhibiting the electric current from flowing from the battery to the actuating unit when the assembly is not in operation.

Preferably, the actuating unit comprises a P-MOSFET transistor, whose gate is connected to the wireless power receiver, and an opto-isolator connected to the transistor and to the radio module.

Preferably, the enabler comprises an NFC passive tag provided with UART interface, and a bistable relay connected to the UART interface, and wherein the UART interface is configured to, upon interaction with an NFC reader, drive the relay to either a position according to which it allows the electric current to flow from the battery to the P-MOSFET transistor or a position according to which it inhibits the electric current from flowing from the battery to the P-MOSFET transistor.

Preferably, the radio module comprises an integrated circuit storing an identity number to identify the locator device over the wireless communication network, and a baseband module configured to store data of at least one pre-defined contact entity, wherein the radio module is configured to, in case of theft of the item, send an alarm message to the at least one pre-defined contact entity.

Preferably, the identity number is printed on the locator device or it is stored in an RFID tag associated with the locator device.

Preferably, the alarm message comprises the identity number of the radio module and localization data indicating a current location of the item.

Preferably, the radio module is configured to periodically repeat sending the alarm message.

According to a second aspect, the present invention provides a theft-detection system for the transportation and storage of an item, the theft detection system comprising a theft-detection assembly as set forth above, and a server connected to the theft-detection assembly over a wireless communication network, the server being configured to cooperate with a database configured to store a shipping record associated with the transportation and storage of the item.

Preferably, the shipping record comprises the identity number of the radio module and a shipping identifier associated with the item.

Preferably, the system further comprises a shipping service application configured to be installed on a user device able to connect to the wireless communication network, the shipping service application being configured to operate the user device to perform at least one action related to the transportation and storage of the item.

Preferably, the at least one action is one or more of: acquiring the identity number of the radio module, acquiring the shipping identifier, send to the server a delivery confirmation message upon delivery of the item, operating the enabler.

Preferably, the database is configured to store a list of authorized identity numbers associated with a number of user devices authorized to operate the enabler.

Preferably, the shipping service application is further configured to, before operating the user device to perform the at least one action, operate the user device to send to the server, through the wireless communication network, the identity number of the user device, wherein the server is configured to check whether the identity number of the user device is comprised within the list and, in the affirmative, to send to the user device an acknowledgement message enabling the user device to perform the at least one action.

According to a third aspect, the present invention provides a locator device for detecting the theft of an item, the locator device being configured to be associated with the item and comprising a wireless power receiver configured to receive electromagnetic waves broadcasted within a given area, the device further comprising an actuating unit and an alarm unit, wherein:
 the actuating unit is connected to the wireless power receiver and is configured to, in the absence of the electromagnetic waves, actuate the alarm unit; and
 the alarm unit comprises a radio module configured to, upon actuation, transmit an alarm message over a wireless communication network.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
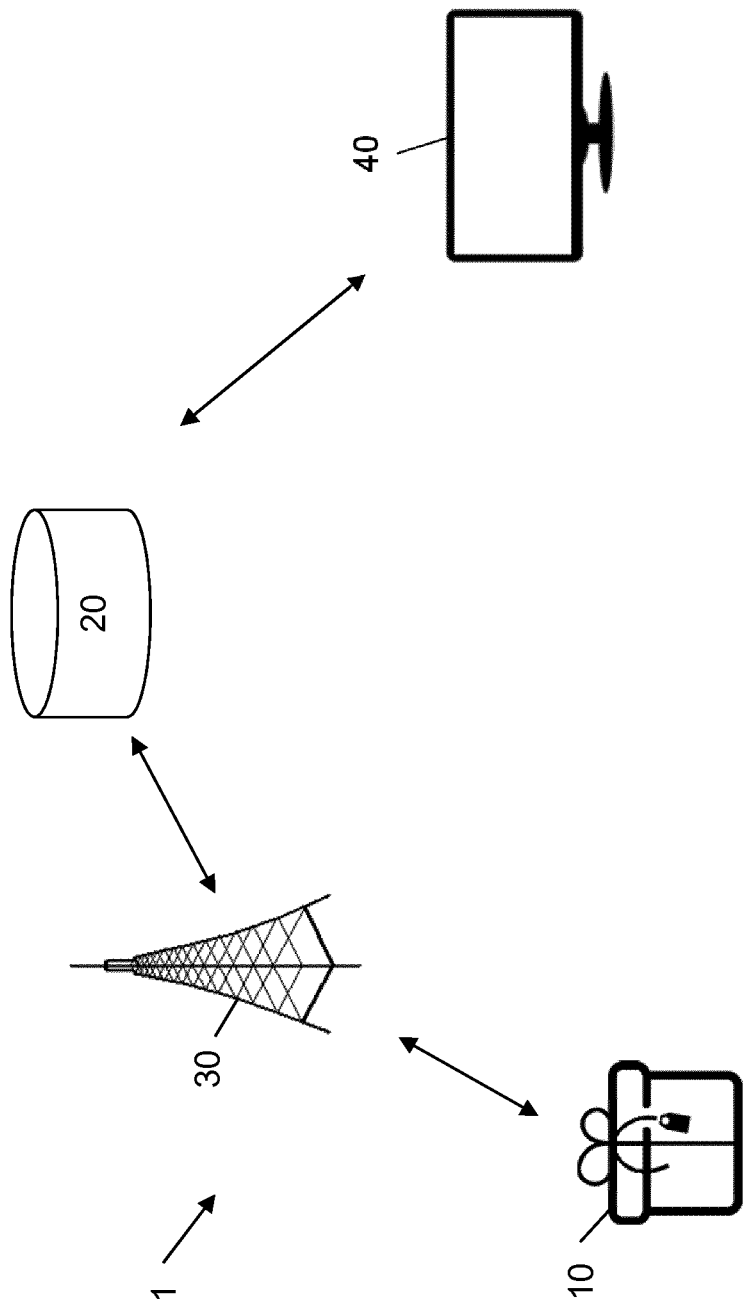
FIG. 1 schematically shows a theft-detection system according to embodiments of the present invention.

FIG. 1 schematically shows a theft-detection system 1 according to embodiments of the present invention. The theft-detection system 1 preferably provides to users an anti-theft service to secure transportation and storage of goods. Users of the anti-theft service according to the present invention may be individuals wishing to secure shipping of goods, and companies providing transportation and tracking services, such as logistics service providers and carriers.

In particular, the theft-detection system 1 may be used by a logistics service provider for monitoring an item or good, for instance contained in a package, during transportation and storage, from a point of origin, where the package is assembled, to an end-use destination. Moreover, the theft-detection system 1 of the present invention may be employed by a user wishing to secure transportation and storage of goods, the user being either the sender of the goods or the goods recipient. Moreover, as it will be clear from the following description, the theft-detection system 1 of the present invention may be employed for monitoring an item that is stored in a secure area (e.g. a warehouse), in order to detect whether the item is moved away from the area.

An exemplary use case in which the system of the present invention may be employed is for securing the transportation of goods that a user buys on an e-commerce website, whose transportation and storage is managed by a logistics service provider.

The system 1 preferably comprises a theft-detection assembly in turn comprising one or more wireless power transmitters and a locator device. The wireless power transmitters are preferably associated with one or more areas in which the goods are supposed to be securely located (which will be indicated as "authorized areas") all along the path from the point of origin to the end-use destination. According to the present invention, a respective authorized area is preferably established inside each vehicle that is transporting the goods. In addition, a respective authorized area may be established inside each warehouse storing the goods before, during and after transportation. An authorized area, e.g. inside a warehouse, is preferably covered by a number of wireless power transmitters. According to the present invention, in each authorized area, a respective number of wireless power transmitters is preferably provided, the number being chosen so as to guarantee a radio coverage of nearly the entire authorized area. A wireless power transmitter may cover an area of about 12 m-15 m.

The locator device is preferably associated with the goods to be monitored or with the package thereof. For instance, the locator device may be installed inside the package used for transporting the goods. In FIG. 1, for simplicity, it is shown a box 10 (e.g. a carton box) representing a package to be monitored according to the anti-theft service of the present invention. In the following description, for sake of simplicity, as a non limiting example, reference will be made to box 10 as being monitored with the theft-detection system of the present invention.

The theft-detection system 1 further preferably comprises a server 20 (e.g., a cloud server), which is able to connect to the theft-detection assembly through a wireless communication network 30 (represented in FIG. 1 by a base station, for simplicity). The server 20 preferably cooperates with a database configured to store records associated with the shipping events handled by the logistics service provider. The database may be physically co-located with a server apparatus or it may be a distributed (or cloud) database.

Further, the theft-detection system 1 may comprise a web application with a user interface (e.g. a dashboard) running in a web browser, which may be accessed and used by an operator at a logistics control center 40 of the logistics service provider by means of an apparatus such as a PC, a tablet, a smartphone, or the like.

The wireless communication network 30 may be, for instance, a GSM (Global System for Mobile Communications) network, a UMTS (Universal Mobile Telecommunications System) network, an LTE (Long Term Evolution) network, an NB-IOT (Narrowband-Internet of Things) network, an LPWAN (Low-Power Wide-Area Network), etc. The server 20 and the apparatuses on which the web application may be used (e.g., the apparatuses of the logistics control center 40) may be connected by means of wireless or wired data links supporting the Internet protocol. Wired links may be xDSL (Digital Subscriber Line) links or optic fiber links.

The wireless power transmitter is configured to be connected to a power source, such as a mains power line, to convert the power to a time-varying electromagnetic field, and to broadcast the electromagnetic field as electromagnetic waves within an area nearby. The wireless power transmitter is a known device and hence it will not be further described herein after. A known wireless power transmitter that may be used in a theft-detection assembly according to the present invention is for example the TX91501 Powercaster® Transmitter broadcasting radio waves in the unlicensed 915 MHz ISM band and produced by Powercast Corporation, based in 566 Alpha Drive, Pittsburgh, Pa. 15238, United States.

The locator device preferably comprises a supply unit comprising a wireless power receiver configured to receive the electromagnetic waves broadcasted by the wireless power transmitter and convert the electromagnetic waves to a DC or AC electric current which may be used by an attached device, such as a battery, for recharging. The wireless power receiver is an RF energy harvesting device which is known and hence it will not be further described herein after. A known wireless power receiver that may be used in a theft-detection assembly according to the present invention is the P1110B Powerharvester® Receiver operating in the frequency range from 850-950 MHz and produced by Powercast Corporation, based in 566 Alpha Drive, Pittsburgh, Pa. 15238, United States.

The locator device further preferably comprises an actuating unit and an alarm unit, connected in cascade. The actuating unit is preferably connected to the supply unit. The actuating unit is preferably configured to actuate the alarm unit when a theft event is detected, while the alarm unit, upon actuation, is configured to generate an alarm, as it will be described in greater detail herein below.

Figure 2:
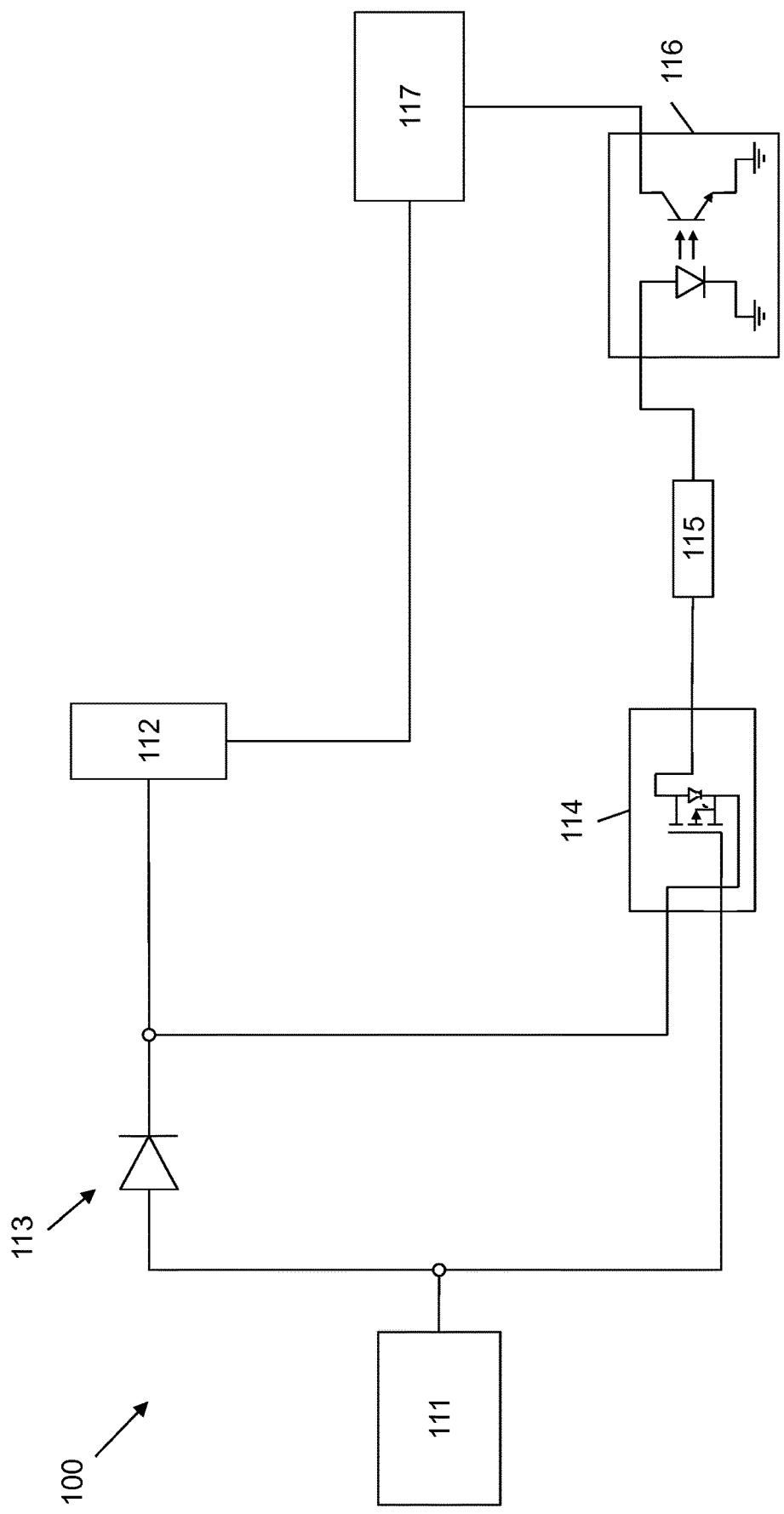
FIG. 2 shows a block scheme of a locator device according to a first embodiment of the present invention.

FIG. 2 is a block scheme of the locator device according to a first embodiment of the present invention.

According to the first embodiment, the supply unit of the locator device preferably comprises:
 the wireless power receiver described above, which is indicated in FIG. 2 with reference number 111;
 a battery 112, connected to the wireless power receiver 111, and configured to supply electricity to the components of the locator device. The voltage supplied by the battery 112 will be indicated as Vdd; and
 a diode 113 connected between the wireless power receiver 111 and the battery 112.

The actuating unit of the locator device preferably comprises:
 a transistor 114, preferably a P-MOSFET transistor, whose gate is connected to the wireless power receiver 111 of the supply unit;
 an opto-isolator 116 connected to the transistor 114. The opto-isolator 116 comprises a light-emitting diode (LED). As it will be clear from the following description, the opto-isolator 116 allows a current to pass through only in case the LED is switched on, which occurs in case the item or the package which the locator device is associated with is moved away from the area covered by the wireless power transmitter; and
 a resistance 115 having a value R, which is interposed between the transistor 114 and the opto-isolator 116. The value R of the resistance 115 is preferably chosen so as to provide the opto-isolator 116 with a supply voltage corresponding to the opto-isolator operating voltage.

The alarm unit preferably comprises a radio module 117, connected to the opto-isolator 116 of the actuating unit. The radio module 117 is preferably configured to support a radio technology for connecting to the wireless communication network 30. The radio technology is preferably one of: GSM, UMTS, LTE, NB-IOT, LPWAN. The radio module 117 preferably comprises an integrated circuit storing an identity number, for instance a SIM card storing the MSISDN number, which can be used to identify and authenticate the radio module 117 over the wireless communication network 30. In the following description, for simplicity but without limitation, the integrated circuit storing an identity number of the radio module 117 will be indicated as "SIM card". The SIM card may be soldered to the circuit board of the radio module 117 or it may be virtually implemented in a secure integrated circuit. The radio module 117 further comprises a baseband module (which may comprise a memory), a transceiver and an antenna. The components of a radio module capable of connecting to a wireless communication network, such as a GSM network or any one of the networks cited above, are known and hence they will not be described in greater detail herein after.

According to embodiments of the present invention, the identity number of the radio module 117 may be printed on the SIM card or on a casing of the radio module 117 or on a document associated with it. According to alternative embodiments, the identity number of the radio module 117 may be stored in an RFID (Radio-Frequency IDdentification) tag that may be attached on an external surface of the casing of the locator device.

The memory of the baseband module of the radio module 117 is preferably configured to store contact data of pre-defined contact entities that are preferably selected to receive possible alarm messages from the radio module 117, as it will be described herein after. The contact data preferably comprise one or more telephone numbers associated with the pre-selected entities, which may comprise: a number of the police, one or more numbers of the logistics service provider in charge of transporting or storing the box 10 (for instance the number of the logistics control center 40), number(s) pre-selected by the sender and/or the recipient of the box 10. The contact data may also be other types of data allowing to contact the pre-selected entities in case of alarm, such as e-mail addresses.

The alarm unit in the locator device may optionally comprise an alarm circuit (not shown in FIG. 2) configured to provide an acoustic alarm. The optional alarm circuit may be connected in series with the opto-isolator 116 and in parallel with the radio module 117.

Further, the alarm unit in the locator device may optionally comprise a GPS module configured to provide localization information. The optional GPS module may be connected in series with the opto-isolator 116 and in parallel with the radio module 117.

In the following lines, the operation of the components of the theft-detection assembly will be described in detail.

Before the locator device is associated with the box 10 within an authorized area, the locator device is not active, namely the battery 112 of the supply unit and the transistor 114 of the actuating unit are electrically insulated (or, in other words, the battery 112 is inhibited from providing any electric current to the transistor 114) and hence the risk of generating an alarm is avoided. This may be accomplished by introducing a barrier associated with the battery 112, such as a battery pull-tab, inhibiting any current from flowing from the battery 112 to the transistor 114 of the actuating unit.

As it will be described in greater detail herein after, once the locator device is activated, the radio module 117 is operated only in case the box 10 is moved away from an authorized area, namely in case the box 10 is subject to theft. Indeed, as long as the locator device is within the area covered by the wireless power transmitter, the wireless power receiver 111 of the locator device receives the electromagnetic waves broadcasted by the wireless power transmitter and provides an electric current to the battery 112. In particular, the electric current provided by the wireless power receiver 111 flows through the diode 113 and charges the battery 112. Moreover, the gate voltage of the transistor 114 inhibits any current from flowing through the transistor 114 (which acts as an "open circuit") so that the opto-isolator 116 and the radio module 117 are not operational. It is to be noticed that, because of the presence of the diode 113, the transistor 114 may be powered only by an electric current provided by the wireless power receiver 111.

In case the locator device is moved away from the area covered by the wireless power transmitter, the wireless power receiver 111 is not capable any more to receive the electromagnetic waves broadcasted by the wireless power transmitter and hence it does not provide any output electric current. In this case, the gate voltage of the transistor 114 drops to zero and allows a current to pass through the transistor 114, generating a voltage on the source terminal of the transistor 114. The voltage on the source terminal of the transistor 114 is supplied to the opto-isolator 116 through the resistance 115. The opto-isolator 116 then supplies a voltage to the radio module 117, which is hence operated and enabled to connect to the wireless communication network 30. In particular, the radio module 117 may send an alarm message (for instance, in the form of an SMS message) addressed to the entities associated with the contact data that are stored in the baseband module of the radio module 117, as it will be described in greater detail herein after.

In the following, the operation of the theft-detection system 1 according to embodiments of the present invention will be described with reference to the use case mentioned above involving the transportation and storage of goods from a point of origin to an end use destination.

According to the present invention, a logistics service provider wishing to use the theft-detection system 1 described herein above, shall register to the theft-detection service and run a graphic user interface (GUI) of the web application on a web browser at the apparatuses of the logistics control center 40.

According to embodiments of the present invention, when a user requests to ship an item from a point of origin to an end use destination, an operator of the logistics service provider takes charge of the item and packages it in a box 10 provided with the locator device described above. The operator is preferably provided with a user device, such as a smartphone or a tablet, configured to establish a wireless data connection with the server 20 through the wireless communication network 30.

Moreover, an operator at, e.g., an apparatus of the logistics control center 40 preferably accesses the GUI of the web application for creating a shipping record in the database comprised in the server 20. The record is associated with the shipping of the box 10 and comprises data related to the shipping, the data comprising, preferably: the identity of the sender (e.g. name, surname and/or company name), the sender address (e.g. street, street number, city, zip code, country), the identity of the recipient (e.g. name, surname and/or company name), the destination address (e.g. street, street number, city, zip code, country), a shipping identifier. The data stored in the shipping record may also comprise the type of goods being shipped and a description of the item being shipped in the box 10. Before dispatching the box 10, the shipping identifier is coded into a shipping code that is preferably associated with the box 10 (e.g. printed on paper and glued on the box 10, or printed directly on the box 10). The shipping code may be an alphanumeric code, a barcode, a QR code or the like. According to alternative embodiments, the shipping code may be stored in an RFID tag. In this case, the RFID tag containing the shipping code is preferably positioned on the box 10 to be shipped, in particular it is preferably attached on an external surface of the box 10.

Then, before dispatching the box 10, the operator in charge of packaging the item to be shipped preferably acquires the shipping identifier and the identity number of the radio module 117 of the locator device associated with the box 10. Acquiring the shipping identifier by the operator may be performed by means of an appropriate reader installed on the operator's user device or on another dedicated device and capable of reading the shipping code, such as an OCR (Optical Character Recognition) reader, a barcode reader or a QR code reader. In particular, the operator may use a dedicated software application, and an appropriate reader, installed on the user device. This software application will be referred to in the following as "shipping service application". In this case, the operator may interact with a GUI of the software application to enable the reader to read the shipping code (by means of for instance a "acquire" button on the GUI). If the shipping code is stored in an RFID tag, the operator may acquire the shipping identifier by employing a device provided with an RFID reader.

As mentioned above, the identity number of the radio module 117 may be printed on the SIM card or on the casing of the locator device or on a document associated with the SIM card and available to the operator. The identity number of the radio module 117 may be printed in alphanumeric form, or in the form of a barcode or a QR code. According to alternative embodiments, the identity number may be stored in an RFID tag. Hence, also the identity number of the radio module 117 may be acquired by the operator by means of an appropriate reader installed on the operator's user device or on another dedicated device, such as an OCR (Optical Character Recognition) reader, a barcode reader or a QR code reader. In particular, the operator may use the shipping service application already cited above, and the appropriate reader, installed on the user device. Alternatively, the operator may manually input the identity number of the radio module 117 into her/his device. If the identity number of the radio module 117 is stored in an RFID tag, the operator may acquire it by employing a device provided with an RFID reader.

Then, the operator preferably uses her/his user device or the dedicated device cited above to send to the server 20 the identity number of the radio module 117 and the shipping identifier. These information may be sent in an SMS message or in another data message (for instance, an email message) over the wireless data connection established between the operator's device and the server 20.

Upon reception of the data, the server 20 preferably uses the received shipping identifier to interrogate the database and store the identity number of the radio module 117 received together with the shipping identifier in the shipping record. In this way, the shipping identifier related to the shipping of box 10 is uniquely associated with the identity number of the radio module 117 of the locator device inside the box 10.

At this point, the operator preferably activates the locator device. Activating the locator device preferably comprises removing the barrier (e.g., the battery pull-tab) inhibiting the current from flowing from the supply unit to the actuating unit of the locator device. Activation is to be performed inside an authorized area. For instance, the authorized area where the locator device is activated may be a warehouse where the item to be shipped is stored or the vehicle inside which the box 10, with the item to be shipped and the locator device, is put for transportation by the carrier.

When the box 10 reaches the recipient, the end user and/or the carrier preferably close the shipping. This may be accomplished by using the shipping service application cited above, running on a user device (such as a smartphone or a tablet) available to the end user and/or the carrier. The end user and/or the carrier may interact with the device through the GUI of the shipping service application and may enable the device to read the shipping code associated with the box 10. Then, the end user and/or the carrier may operate the device, through the GUI of the shipping service application, to send a delivery confirmation message to the server 20. Upon reception of the delivery confirmation message from the end user and/or the carrier, the server 20 preferably updates the shipping record associated with the considered delivery with an information indicating that shipping has been closed by the end user and/or the carrier. The procedure above for closing shipping shall be performed inside an authorized area, e.g. in the vicinity of the vehicle that delivered the box 10 to destination, in order to avoid false alarms.

If, at destination, the vehicle transporting the box 10 enters a warehouse having a radio coverage provided by one or more wireless power transmitters of an anti-theft assembly according to the present invention, the procedure for closing shipping may be performed also once the box 10 is stored in the warehouse.

In case the box 10 is subjected to theft during transportation or storage before delivery to the end user, the locator device preferably activates. In this case, an alarm message is preferably sent by the radio module 117 of the alarm unit of the locator device to the entities associated with the contact data that are preferably stored in the baseband module of the radio module 117. The alarm message preferably comprises:
the identity number of the radio module 117;
localization data indicating the location of the box 10 when the alarm is raised. Localization data may comprise an identifier of the cell of the wireless communication network 30 inside which the radio module 117 is located, or they may comprise GPS data provided by the optional GPS module of the alarm unit; and
optionally, time data indicating the date and the time of the day at which the alarm is raised.

The alarm message may be an SMS message, or another type of data message, such as an e-mail message.

Preferably, the radio module 117 periodically repeats sending an alarm message as described above. Each time an alarm message is sent, it may contain an updating of the information listed above (e.g. the localization data), which allows tracking the position of the box 10. The period of repetition of the alarm messages is preferably chosen by determining a trade-off between energy consumption and localization accuracy: indeed, a short period of repetition guarantees a more accurate localization of box 10 but the total number of alarm messages that may be sent is bounded by energy consumption and this may determine a limited-duration tracking of the position of the box 10. The period of repetition of the alarm messages may be, for instance, comprised between about 30 seconds and about 90 seconds. It is preferably configurable upon installation of the locator device.

When the alarm message reaches one of the pre-selected entities, for instance the logistics control center 40, the locator device that is generating the alarm is identified and its position is determined from the localization data. For instance, if the message is an SMS message containing the identifier of the cell of the wireless communication network 30 inside which the radio module 117 is located, the position of the locator device may be determined on the basis of the identifiers of the neighboring cells, the intensity of the radio signal carrying the message, its round-trip delay and other network information.

Advantageously, the present invention provides a theft-detection system for the transportation and storage of goods, which allows monitoring, in a complete and reliable way, whether the goods are securely shipped towards destination. In particular, the system of the present invention allows to timely generate an alarm as soon as the locator device associated with the goods is moved few meters away from an authorized area, so that an intervention may be readily programmed in order to recover the stolen goods.

Moreover, the system of the present invention provides for continuously recharging the battery of the locator device thanks to an energy harvesting technique. In principle, the locator device is operating indefinitely until it is located inside the authorized area. Indeed, the alarm unit of the locator device is activated only when it moves away from an authorized area that is radio covered by the wireless power transmitters. This advantageously means that the battery charge is actually used only in case of theft. This allows greatly reducing the energy consumption with respect to known systems and in addition it allows using less costly batteries than known systems.

Furthermore, the system of the present invention is advantageously robust against the so called "jamming". Typically, jammers introduce disturbances over certain frequency channels in order to hinder transmission of alarms. According to the system of the present invention, in case of theft, an alarm is raised meters away from the relevant authorized area where the theft event occurred, which may be covered also by the jammers' electromagnetic waves, and the alarm message is repeatedly sent by the locator device while the stolen goods are moved away from that area. This means that, advantageously, the alarm message can not be hindered by jammers as the locator device is outside their radio coverage. Indeed, as mentioned above, typically the radius of an authorized area covered by a wireless power transmitter is nearly 12-15 meters, which is slightly shorter than the radius of the coverage area of a typical jammer, which is nearly 20 meters. Even in case the first alarm messages sent by the locator device are hindered by the jammer, the other alarm messages, which are sent while the stolen goods are moved away, advantageously can not be hindered and allow the theft to be promptly detected.

Figure 3:
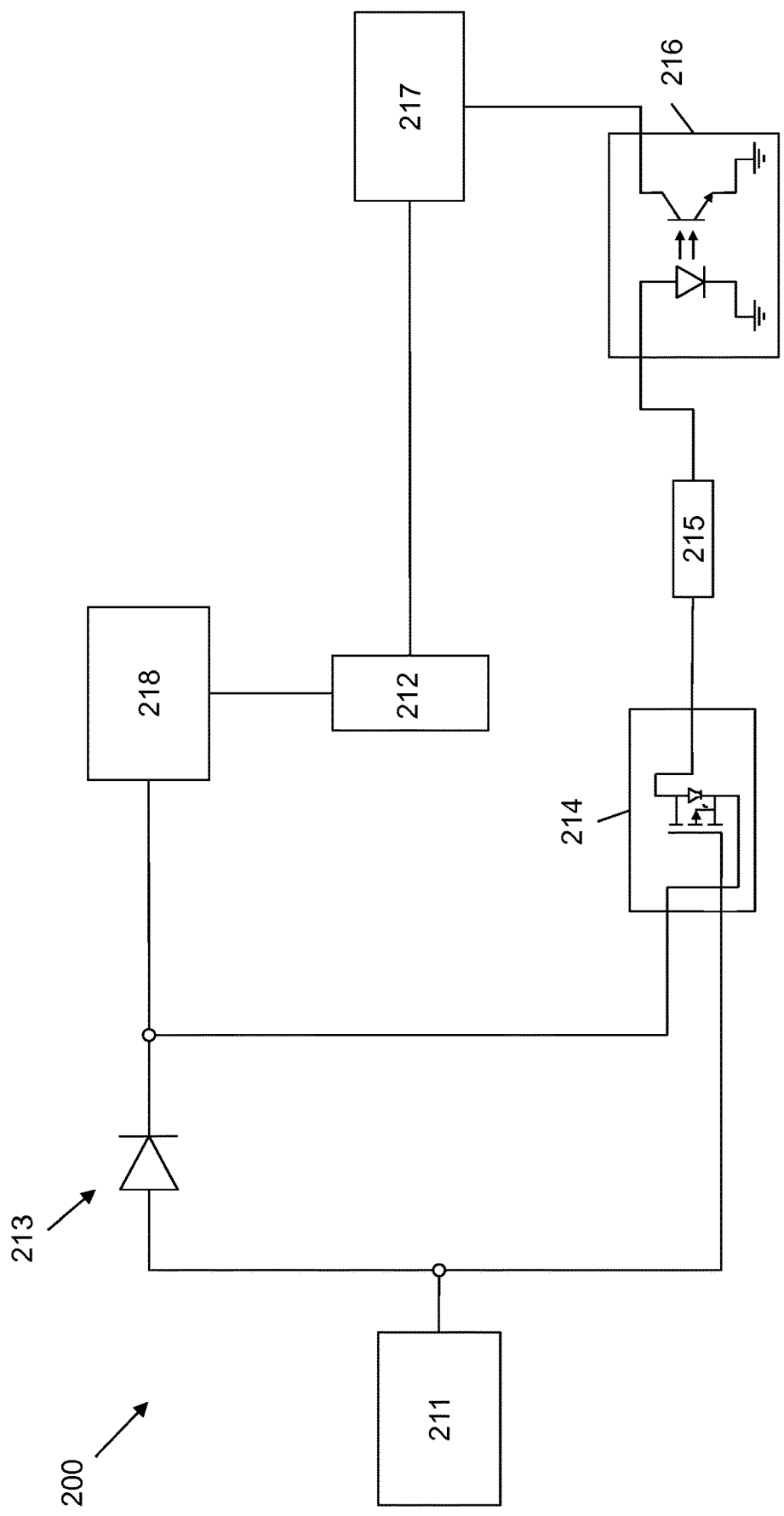
FIG. 3 shows a block scheme of a locator device according to a second embodiment of the present invention.

FIG. 3 is a block scheme of a locator device 200 according to a second embodiment of the present invention. Components of the locator device 200 of this second embodiment corresponding to those of the locator device 100 of the first embodiment will be indicated by corresponding reference numerals.

The actuating unit and the alarm unit of the locator device 200 according to this second embodiment, are the same as those already described above with reference to the locator device 100 according to the first embodiment. The supply unit of the locator device 200 according to this second embodiment differs from the corresponding supply unit of the locator device 100 according to the first embodiment for the presence of an enabler 218. The enabler 218 is preferably interposed between the battery 212 and the diode 213. The enabler 218 is preferably configured to activate/deactivate the locator device, as it will be described in detail herein after. For instance, the enabler 218 may be used to deactivate the locator device in order to avoid false alarms when the box 10 with the item to be shipped is transported across an area that is not under any radio coverage of a wireless power transmitter of the theft-detection assembly of the present invention.

The enabler 218 preferably comprises an NFC (Near Field Communication) passive tag provided with UART (Universal Asynchronous Receiver/Transmitter) interface, and a bistable relay connected to the UART interface. The NFC tag is also provided with a unique identifier stored in the memory of the NFC tag. In this case, when an NFC reader is brought near the enabler 218, a current pulse is generated on the UART interface, which drives the relay to either a first contact position (contacts closed) or a second contact position (contacts open). Each contact position is stable in that it may be maintained without power applied to the relay.

The enabler 218 may be used for activating the locator device only when it is in the proximity of a wireless power transmitter of a theft-detection assembly according to the present invention. Moreover, as mentioned above, the enabler 218 may be used for deactivating the locator device when the locator device is not in the proximity of a wireless power transmitter. For operating the enabler 218, a user (e.g. the operator of the logistics service provider or a carrier) shall bring near the enabler 218 an NFC reader and activate the NFC tag, as described above. This may be accomplished by the operator using her/his user device (a smartphone or a tablet) and bringing it near the box 10 containing the locator device, provided that the user device comprises an NFC reader. The user device may also comprise a software application having a GUI allowing the user to operate the enabler 218 (by means, for instance of activate/deactivate buttons on the GUI). The software application may be the shipping service application cited above.

When the NFC reader is brought near the enabler 218, the relay is driven from the first contact position to the second contact position, or viceversa, allowing to activate/deactivate the locator device. In other words, the enabler 218 can be operated to selectively inhibiting an electric current from flowing from the battery 212 to the actuating unit. Indeed, in one case, the contacts are brought to a position allowing the electric current to flow from the battery 212 of the supply unit to the transistor 214 of the actuating unit, while in the other case the contacts are brought to a position inhibiting the electric current from flowing from the battery 212 of the supply unit to the transistor 214 of the actuating unit.

The use of the enabler 218 advantageously allows activating/deactivating the locator device even when the locator device is closed inside the box 10. In particular, the use of the enabler 218 allows activating/deactivating the locator device without opening the box 10 each time a passage of the box delivery takes place.

According to embodiments of the present invention, in order to avoid fraudulent actions such as disabling the locator device to steal the box 10, control procedures may be set up. According to these embodiments, a first list comprising identity numbers of SIM cards related to user devices that are authorized to activate/deactivate the locator device associated with a given shipping may be stored in the database cooperating with the server 20. Additionally, the same database may store a second list comprising events, wherein each event indicates a situation in which the locator device has been enabled or disabled. According to these embodiments, each time an operator (the operator of the logistics service provider, the carrier, the end user, etc.) selects, on the GUI of the shipping service application, an action to be performed related to the shipping of the box 10 (such as reading the shipping code, or the identity number of the SIM card of the locator device, closing shipping, or activating/deactivating the locator device by means of the enabler), the shipping service application operates the user device to send to the server 20 the identity number stored in the SIM card of the user device. Upon receiving the identity number of the user device, the server 20 may check whether it is comprised in the first list of authorized identity numbers. If the check is positive, the server 20 may send an acknowledgment message to the user device, enabling the user device to perform the selected action. The acknowledgment message may for instance contain a password that the operator shall input on the GUI of the shipping service application to proceed. For instance, the password may be used to enable the NFC reader to write into a given register of the memory of the NFC tag in the locator device, which may trigger the generation of the current pulse that changes the contact position of the relay. If the check is negative, an alarm is raised.

According to a variant of the second embodiment of the present invention, the theft-detection system 1 provides for monitoring the entities (e.g. operator of the logistics service provider, carriers, end user) that take charge of the box 10 during shipping. According to this variant, the NFC tag identifier of the enabler 218 is associated with the data stored in the database as related to the shipping of box 10. Association may be performed upon activation of the locator device by the operator of the logistics service provider that assembles the box 10. In particular, the operator may use her/his user device to run the shipping service application and operate, through the GUI, the NFC reader to acquire the NFC tag identifier. Then, the NFC tag identifier may be sent to the server 20 by means of the same user device, so that it may be stored in the database record related to the shipping of the box 10. According to this variant, each time a carrier hands the box 10 to another carrier, she/he may use the shipping service application on her/his user device to disable the locator device, read the NFC tag and send to the server 20 the following data:

- the identifier of the NFC tag;
- date and time of the day indicating when the locator device has been disabled;
- localization data indicating where the locator device has been disabled (e.g. an identifier of the cell of the wireless communication network 30 inside which the user device of the carrier is located, or GPS data); and
- information indicating the identity of the carrier taking charge of the box 10.

According to this variant, each time a carrier is taking charge of the box 10, she/he may use the shipping service application on her/his user device to activate the locator device and send to the server 20 date and time of the day indicating when the locator device has been activated, localization data indicating where the locator device has been activated and information indicating the identity of the carrier taking charge of the box 10. The shipping service application through the GUI may provide the carrier with a feedback (e.g. a text message) indicating that the locator device has been correctly deactivated/activated.

In case a carrier is using a vehicle without any wireless power transmitter, the carrier may disable the locator device as described above and use the shipping service application to send a notification message to the server 20 (an SMS message or a data message) indicating that the box 10 is currently transported by a vehicle not provided with a wireless power transmitter. The message may also indicate the destination and an estimated time of delivery, so that the shipping may be monitored even when the theft-detection assembly is not operating.

Using the shipping service application allows to track the position of the box 10, the transit times and the identity of the carriers taking charge of the box 10 during shipping without using the radio module of the locator device, which activates only in case of theft.

The invention claimed is:

1. A theft-detection assembly for detecting a theft of an item, the theft-detection assembly comprising:
 a wireless power transmitter configured to broadcast electromagnetic waves within a given area;
 a locator device configured to be associated with said item and comprising a wireless power receiver configured to receive said electromagnetic waves, said locator device further comprising an actuator and an alarm, wherein:
 the actuator is connected to said wireless power receiver and is configured to, in the absence of said electromagnetic waves, actuate the alarm; and
 the alarm comprises a radio module configured to, upon actuation, transmit an alarm message over a wireless communication network, wherein
 the actuator comprises a transistor, whose gate is connected to said wireless power receiver, and an opto-isolator connected to said transistor and to said radio module.

2. The theft-detection assembly according to claim 1, wherein said locator device comprises a battery connected to said wireless power receiver and wherein said wireless power receiver is configured to, upon reception of said electromagnetic waves, generate an electric current and provide said electric current to said battery.

3. The theft-detection assembly according to claim 2, wherein said locator device comprises a barrier associated with said battery for inhibiting said electric current from flowing from said battery to said actuator when the assembly is not in operation.

4. The theft-detection assembly according to claim 2, wherein said locator device comprises an enabler interposed between said battery and said actuator, said enabler being operable to selectively inhibiting said electric current from flowing from said battery to said actuator when the assembly is not in operation.

5. The theft-detection assembly according to claim 1, wherein said actuator comprises a P-MOSFET transistor.

6. The theft-detection assembly according to claim 5, wherein said enabler comprises an NFC passive tag provided with UART interface, and a bistable relay connected to the UART interface, and wherein said UART interface is configured to, upon interaction with an NFC reader, drive said relay to either a position according to which it allows said electric current to flow from said battery to said P-MOSFET transistor or a position according to which it inhibits said electric current from flowing from said battery to said P-MOSFET transistor.

7. The theft-detection assembly according to claim 1, wherein said radio module comprises an integrated circuit storing an identity number to identify the locator device over said wireless communication network, and a baseband module configured to store data of at least one pre-defined contact entity, wherein said radio module is configured to, in case of theft of said item, send an alarm message to said at least one pre-defined contact entity.

8. The theft-detection assembly according to claim 7, wherein said identity number is printed on said locator device or it is stored in an RFID tag associated with said locator device.

9. The theft-detection assembly according to claim 7, wherein said alarm message comprises said identity number of the radio module and localization data indicating a current location of said item.

10. The theft-detection assembly according to claim 7, wherein said radio module is configured to periodically repeat sending said alarm message.

11. A theft-detection system for the transportation and storage of an item, the theft detection system comprising a theft-detection assembly according to claim 1, and a server connected to said theft-detection assembly over a wireless communication network, said server being configured to cooperate with a database configured to store a shipping record associated with the transportation and storage of said item.

12. The theft-detection system according to claim 11, wherein said shipping record comprises said identity number of said radio module and a shipping identifier associated with said item.

13. The theft-detection system according to claim 11, wherein said system further comprises a shipping service application configured to be installed on a user device connected to said wireless communication network, said shipping service application being configured to operate said user device to perform at least one action related to said transportation and storage of said item.

14. The theft-detection system according to claim 13, wherein said at least one action is one or more of: acquiring said identity number of said radio module, acquiring said shipping identifier, sending to said server a delivery confirmation message upon delivery of said item, operating said enabler.

15. The theft-detection system according to claim 13, wherein said database is configured to store a list of authorized identity numbers associated with a number of user devices authorized to operate said enabler.

16. The theft-detection system according to claim 15, wherein said shipping service application is further configured to, before operating said user device to perform said at least one action, operate said user device to send to said server, through said wireless communication network, said identity number of said user device, wherein said server is configured to check whether said identity number of said user device is comprised within said list and, in the affirmative, to send to said user device an acknowledgement message enabling said user device to perform said at least one action.

17. A locator device for detecting a theft of an item, the locator device being configured to be associated with said item and comprising a wireless power receiver configured to receive electromagnetic waves broadcasted within a given area, said device further comprising an actuator and an alarm, wherein:
- the actuator is connected to said wireless power receiver and is configured to, in the absence of said electromagnetic waves, actuate the alarm; and
- the alarm comprises a radio module configured to, upon actuation, transmit an alarm message over a wireless communication network, wherein
- the actuator comprises a transistor, whose gate is connected to said wireless power receiver, and an opto-isolator connected to said transistor and to said radio module.

\* \* \* \* \*